(12) United States Patent
Meyer et al.

(10) Patent No.: US 10,282,506 B1
(45) Date of Patent: May 7, 2019

(54) SYSTEMS AND METHODS FOR CLOCK TREE CLUSTERING

(71) Applicant: Cadence Design Systems, Inc., San Jose, CA (US)

(72) Inventors: Dirk Meyer, Elsworth (GB); Zhuo Li, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 64 days.

(21) Appl. No.: 15/688,725

(22) Filed: Aug. 28, 2017

(51) Int. Cl.
*G06F 1/10* (2006.01)
*G06F 17/50* (2006.01)

(52) U.S. Cl.
CPC ............ *G06F 17/5077* (2013.01); *G06F 1/10* (2013.01); *G06F 17/509* (2013.01); *G06F 2217/62* (2013.01)

(58) Field of Classification Search
CPC .................................................. G06F 17/5077
See application file for complete search history.

(56) References Cited

U.S. PATENT DOCUMENTS

| | | | | |
|---|---|---|---|---|
| 6,367,060 B1* | 4/2002 | Cheng | ................... | G06F 17/505 716/114 |
| 6,434,704 B1* | 8/2002 | Dean | ........................ | G06F 1/10 713/320 |
| 6,609,228 B1* | 8/2003 | Bergeron | ............ | G06F 17/5072 716/113 |
| 6,701,506 B1* | 3/2004 | Srinivasan | ................ | G06F 1/10 327/270 |
| 8,205,182 B1* | 6/2012 | Zlatanovici | ........... | G06F 17/505 703/16 |
| 8,977,995 B1* | 3/2015 | Arora | ..................... | G06F 17/505 716/105 |
| 2001/0025368 A1* | 9/2001 | Cooke | ....................... | G06F 1/10 716/124 |
| 2006/0190899 A1* | 8/2006 | Migatz | ...................... | G06F 1/10 716/114 |
| 2007/0016884 A1* | 1/2007 | Nishimaru | .......... | G06F 17/5045 716/113 |
| 2015/0331981 A1* | 11/2015 | Mulvaney | ........... | G06F 17/5031 716/134 |

* cited by examiner

*Primary Examiner* — Suresh Memula
(74) *Attorney, Agent, or Firm* — Schwegman Lundberg & Woessner, P.A.

(57) ABSTRACT

Systems, methods, media, and other such embodiments described herein relate to generation of clock routing trees. One embodiment involves accessing a circuit design and a clock tree hierarchy input indicating a nested list of partition or sink groups, each group of the nested list of groups comprising one or more clock tree elements of a plurality of clock tree elements from the circuit design. A routing topology associated with a source and a plurality of sinks are determined based on an ordering within the nested list of partition groups. These routing directions are used in synthesizing a clock tree for the circuit design. In additional embodiments, the clock tree hierarchy input provides clustering information, port placement for connections between partition groups of the clock tree, and parameters describing limitations or criteria for individual partition groups.

20 Claims, 13 Drawing Sheets

{{802,804}{{806,808}{{810,812}{894}}{896]}{892]}

SYSTEMS AND METHODS FOR CLOCK TREE CLUSTERING

TECHNICAL FIELD

Embodiments described herein relate to electronic design automation (EDA), and to systems, methods, devices, and instructions for generating circuit designs including clock trees based on clustering inputs.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks are also part of such EDA system operations. Schematic and layout information for such block portions of a design may be exchanged or licensed as intellectual property. Clock trees are structures within a circuit design that propagate a clock signal to different elements of the circuit. Various portions of a circuit may be subject to EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
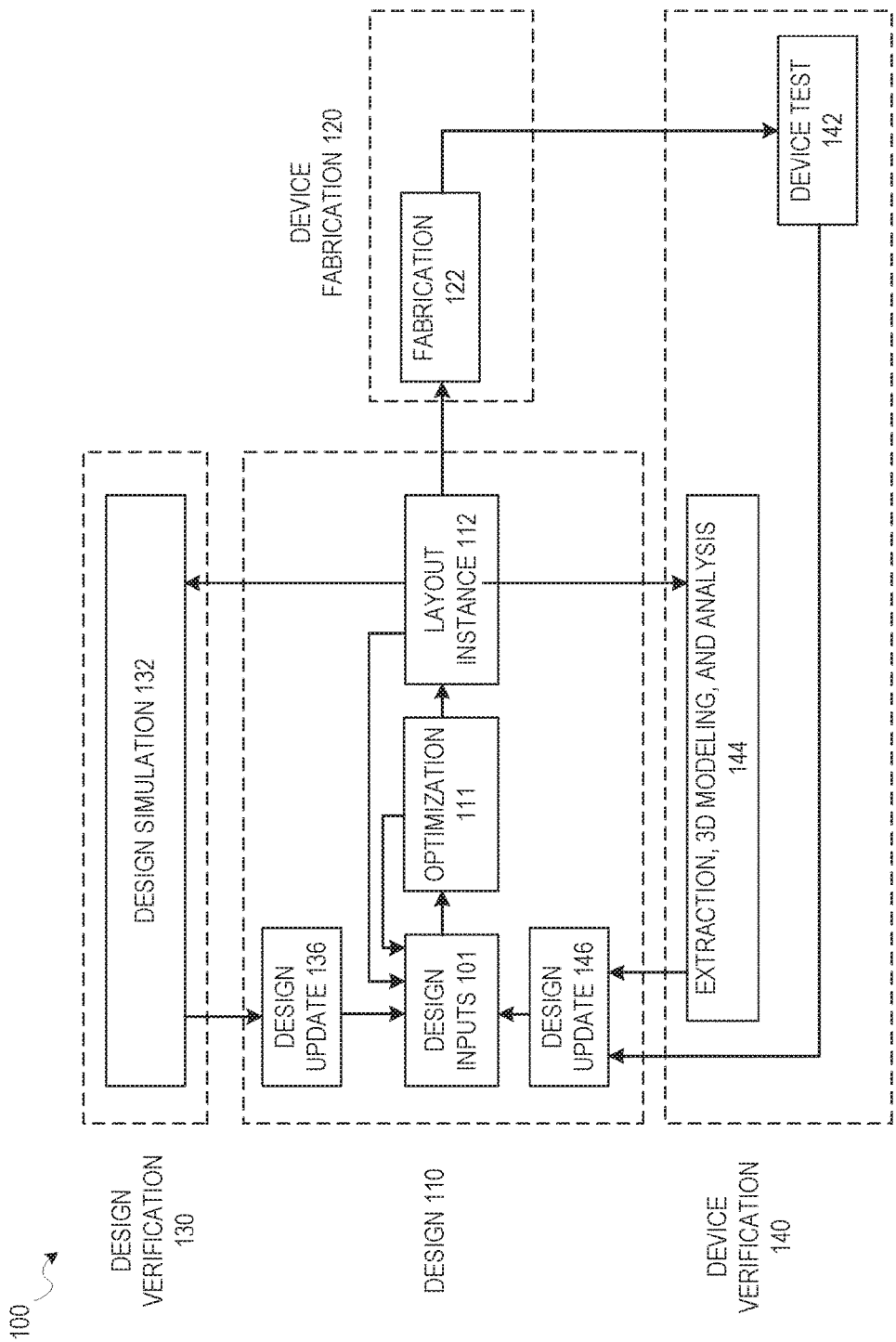
FIG. 1 is a diagram illustrating one possible design process flow which includes elements for clock tree clustering in accordance with some embodiments.

Embodiments described herein relate to electronic design automation (EDA) and to methods, computer media, and devices used for analyzing, optimizing, and creating electronic circuits. One of the many complex elements of circuit design is the generation of routing trees that convey a signal from a signal origin, or source, to a signal destination, or sink. A clock routing tree, for example, has a single source, with hundreds or thousands of destination sinks. Additionally, the design may have limits on the amount of time a signal can take to get to the furthest sink (e.g., a maximum arrival time) as well as limits on the differences between arrival times at various sinks and limits on the total route length for any individual branch in a tree.

In some automated clock tree synthesis (CTS) design flows, it can be useful to constrain the clustering of the clock tree based on certain properties of the circuit design. For example, in some top-level aspects of a circuit design, designers may wish to group partitions and control the transitions of clock signals across partition group boundaries during early stages of the design flow in order to guide the front-end design and to simplify very large designs to implement different partitions in parallel. Previous systems to enable such early-stage clustering, however, involve considerable manual interaction, which reduces the benefits of such operations. Modification of a logical hierarchy and connectivity before CTS, or creation of a repeater tree at the beginning of CTS, are manual processes that provide some benefits, but consume significant designer time resources, and also may cause problems with the design flow or eventual design results. Preserved repeaters in a clock tree from such manual clustering, for example, may adversely impact the quality of the resulting clock tree.

Embodiments described herein enable clustering constraints with options for low impact on designer time resources, while enabling complex routing rules which may be used to guide the final clock tree. Some embodiments provide methods and systems to specify clustering intent by referring to design objects, such as clock sinks or partitions, and grouping them hierarchically using nested lists. Some such embodiments enable partition groups with controls for transitions of clock signals across partition group boundaries along with further limits on signals or clock tree elements associated with partitions and partition boundaries. The use of clustering constraints input to an EDA system as clock tree hierarchy inputs indicating nested partition groups with optional parameter characteristics provides the benefit of high-level clustering inputs to guide clock tree routing without the excessive demands of the manual solutions. While certain embodiments detailed below specifically describe synthesis of a clock tree, other embodiments may be used to generate routing trees for other aspects of a circuit design, such as power distribution topologies, data path topologies, or any other such aspects of a circuit design.

FIG. 1 is a diagram illustrating one possible design process flow which includes elements for clock tree clustering in accordance with some embodiments. This includes possible design process flows for CTS timing and signal integrity analysis to generate a circuit design and an associated circuit in accordance with various example embodiments, and operations for modifying such circuits automatically to generate clock routing tree structures that comply with limits or design goals for skew, wire length, maximum arrival time, and other such timing considerations. In accordance with embodiments herein, such design process flows accommodate clock tree hierarchy inputs which place limits and guidance boundaries on some aspects of CTS. It will be apparent that other design flow operations may function using the clock tree clustering constraints and optimizations described herein, but a design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and sinks are generated, before adjustments are made to ensure that timing requirements for each sink are met. The initial strategy, tactics, and context for the device to be created are also generated in the design input operation 101, depending on the particular design algorithm to be used. In various embodiments, clock tree hierarchy inputs may be input to an EDA system as part of a design operation. Examples of such inputs are illustrated and discussed below, particularly with respect to FIGS. 4A and 5B, which provide example illustrations of particular inputs that may be provided.

In some embodiments, following an initial selection of design values in the design input operation 101, updates to an initial routing tree may be generated in accordance with various embodiments described herein during an optimization operation 111 or a layout instance 112, along with any other automated design processes. As described below, design constraints for a routing tree structure and sinks which receive a signal from the routing tree structure may be initiated with design inputs in the design input operation 101, and then may be analyzed using timing analysis according to various embodiments. In some such embodiments, an initial set of clustering constraints may be provided for an initial clock tree, and the clustering constraints may be modified or removed in additional iterations of a clock tree, based on other competing circuit design criteria. In other embodiments, the clustering constraints may remain constant throughout the design flow process. While the design flow 100 shows optimization occurring prior to the layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating and updating a routing tree structure may therefore involve iterations of the design input operation 101, optimization operation 111, and layout instance 112 generation. In other systems, other design processes may be used. Similarly, clock tree hierarchy inputs describing nested lists of partition groups and other clustering guidance for a clock tree may be updated by a designer at any point in a design process flow.

After design inputs are used in the design input operation 101 to generate a circuit layout, and any optimization operations 111 are performed, a layout is generated in the layout instance 112. The layout describes the physical layout dimensions of the device that match the design inputs. This layout may then be used in the device fabrication operation 122 to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, design updates 136 from the design simulation 132; design updates 146 from the device test 142 or extraction, 3D modeling, and analysis 144 operations; or a direct design input operation 101 may occur after an initial layout instance 112 is generated. In various embodiments, whenever design inputs are used to update or change an aspect of a circuit design, a timing analysis and optimization operation 111 may be performed, and any needed updates to a clock routing tree or any other aspect of a circuit design may be made.

Figure 2:
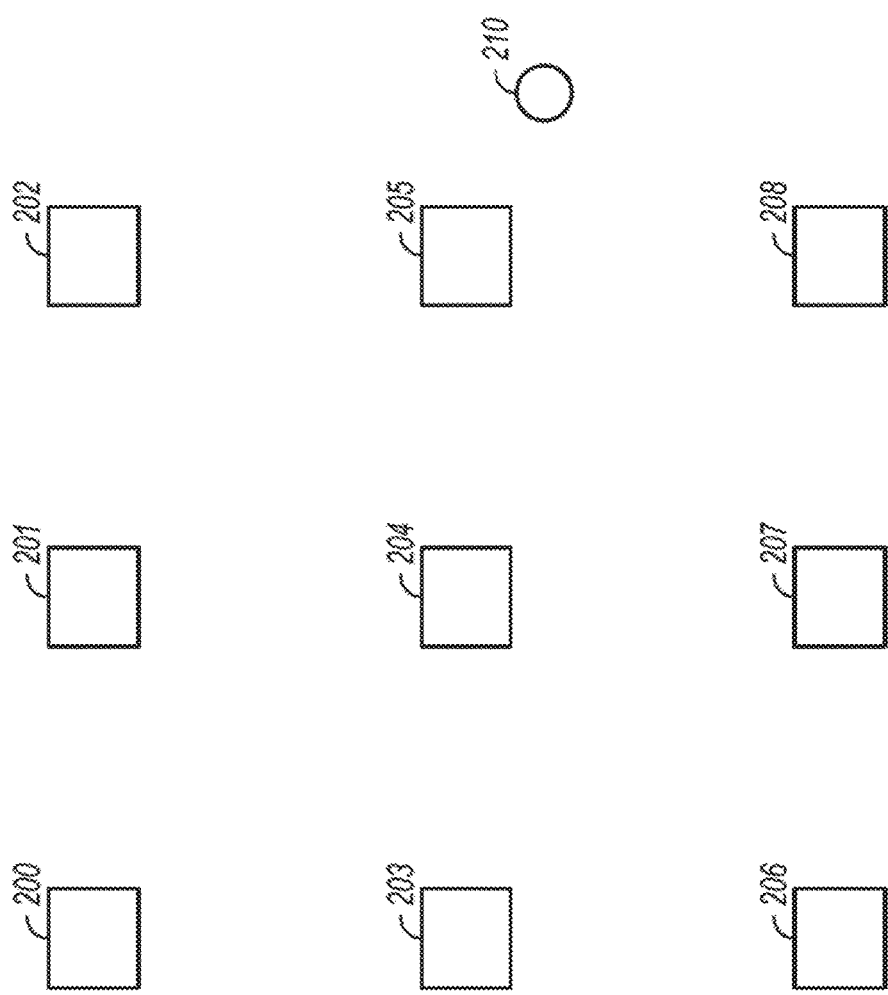
FIG. 2 illustrates aspects of clock tree generation in accordance with some embodiments described herein.
Figure 3:
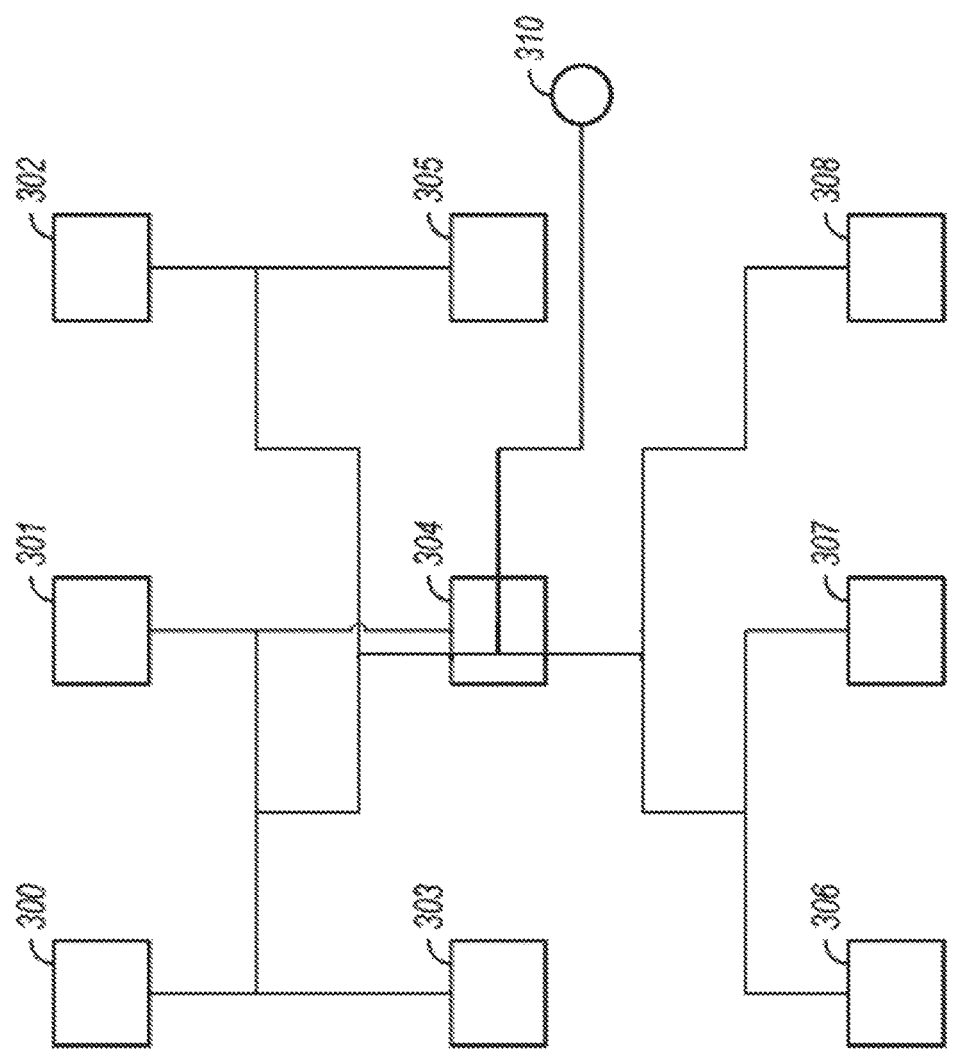
FIG. 3 illustrates aspects of clock tree generation in accordance with some embodiments described herein.

FIGS. 2 and 3 illustrate aspects of clock tree generation in accordance with some embodiments described herein. FIG. 2 includes a source 210 and sinks 200-208. The source 210 and sinks 200-208 may be considered clock tree elements which are part of a circuit design. As part of the circuit design, the sinks 200-208 need to be connected to the source 210 to provide a clock signal to the sinks 200-208. Additionally, as part of the clock tree, repeaters (e.g. buffers, inverters, etc.) and other clock tree elements may be included, but such elements are not shown in FIGS. 2 and 3 for simplicity. Clock tree synthesis involves generating the connecting paths from the source 210 to the sinks 200-208. FIG. 3 illustrates an example embodiment of a clock tree with routes from a source 310 to sinks 300-308. In various different embodiments, different routines may be used to connect the sinks 300-308 with the associated source 310. Adjustments to the clock tree routing may be made in various design iteration to meet skew requirements, maximum arrival time characteristics, or other such criteria for a given circuit design. In some embodiments, for example, the topology for routing operates using clustering as described herein, and further is generated using limitations, rules, or design constraints related to generation of a symmetrical distribution structure (e.g. an H-tree). In such embodiments, clustering and routing for the topology of a clock tree is done in conjunction with routing to balance the structures in various branches of a routing tree (e.g. clock tree). For a circuit design including layout details for a source and associated sinks, a CTS tool may choose the routing and buffering to generate the clock tree based on connection algorithms within the CTS tool and the provided limitations associated with the circuit design.

Figure 4A:
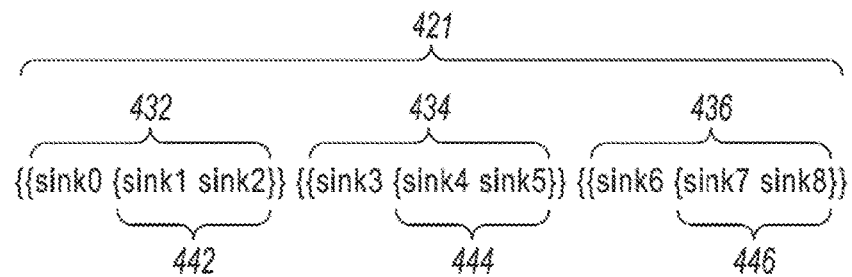
FIG. 4A illustrates aspects of clock tree clustering in accordance with some embodiments described herein.
Figure 4B:
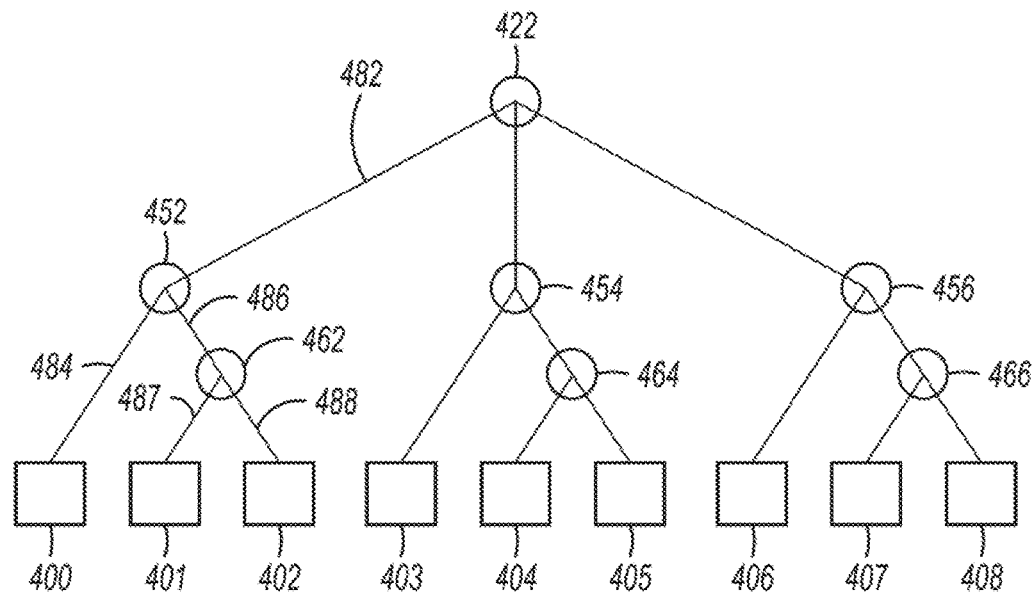
FIG. 4B illustrates aspects of clock tree clustering in accordance with some embodiments described herein.
Figure 4C:
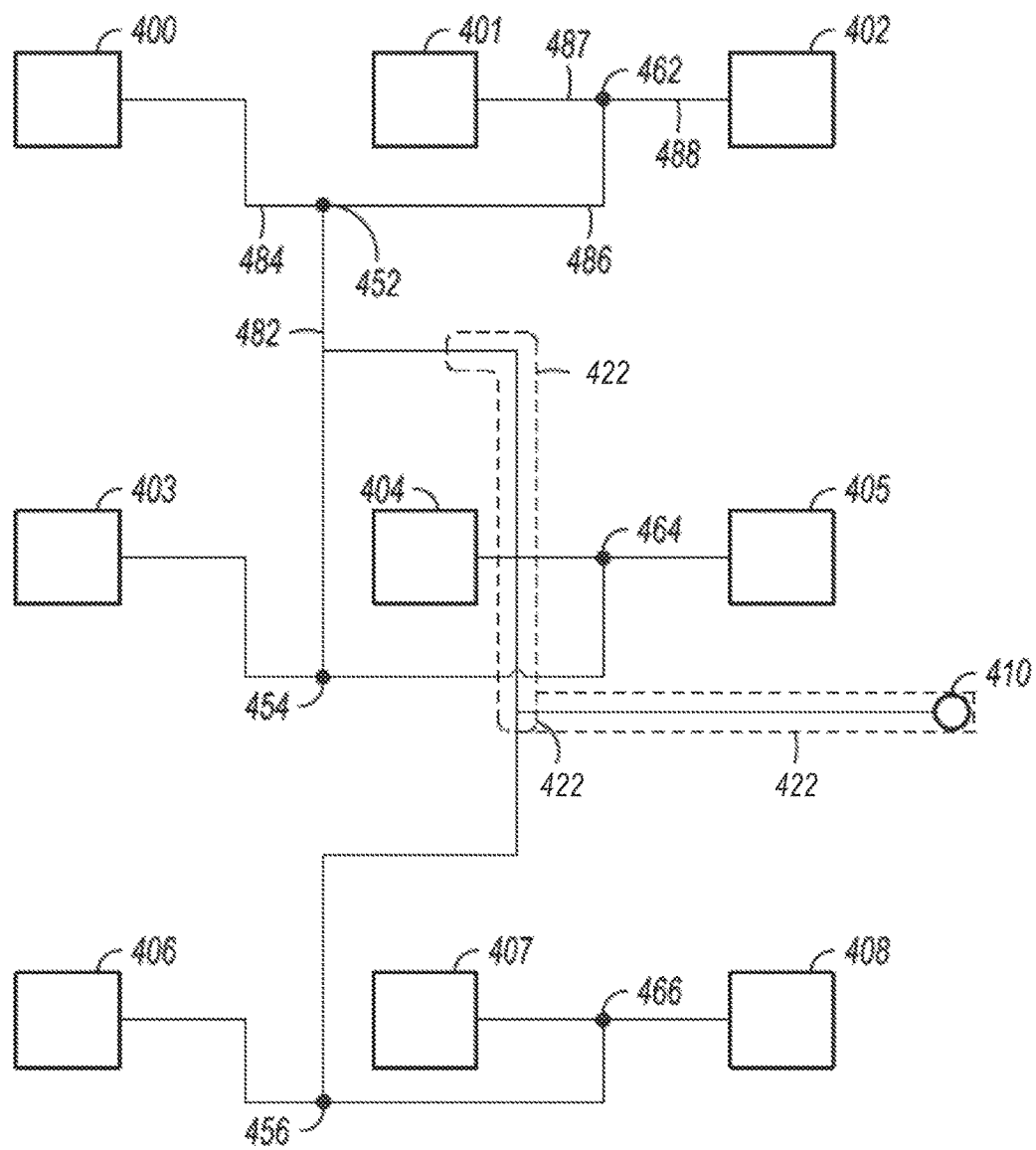
FIG. 4C illustrates aspects of clock tree clustering in accordance with some embodiments described herein.

FIGS. 4A-C illustrate aspects of clock tree clustering in accordance with some embodiments described herein. FIG. 4A shows a clock tree hierarchy input indicating a nested list of sink groups, with each sink group having one or more corresponding clock tree elements. FIG. 4B shows an illustrated clock tree with branches corresponding to the syntax of the clustering represented by the clock tree hierarchy input of FIG. 4A. FIG. 4C shows an example routing with routes corresponding to the branches of FIG. 4B and the routing directions indicated by the structure of the clock tree hierarchy input of FIG. 4A.

Figure 5A:
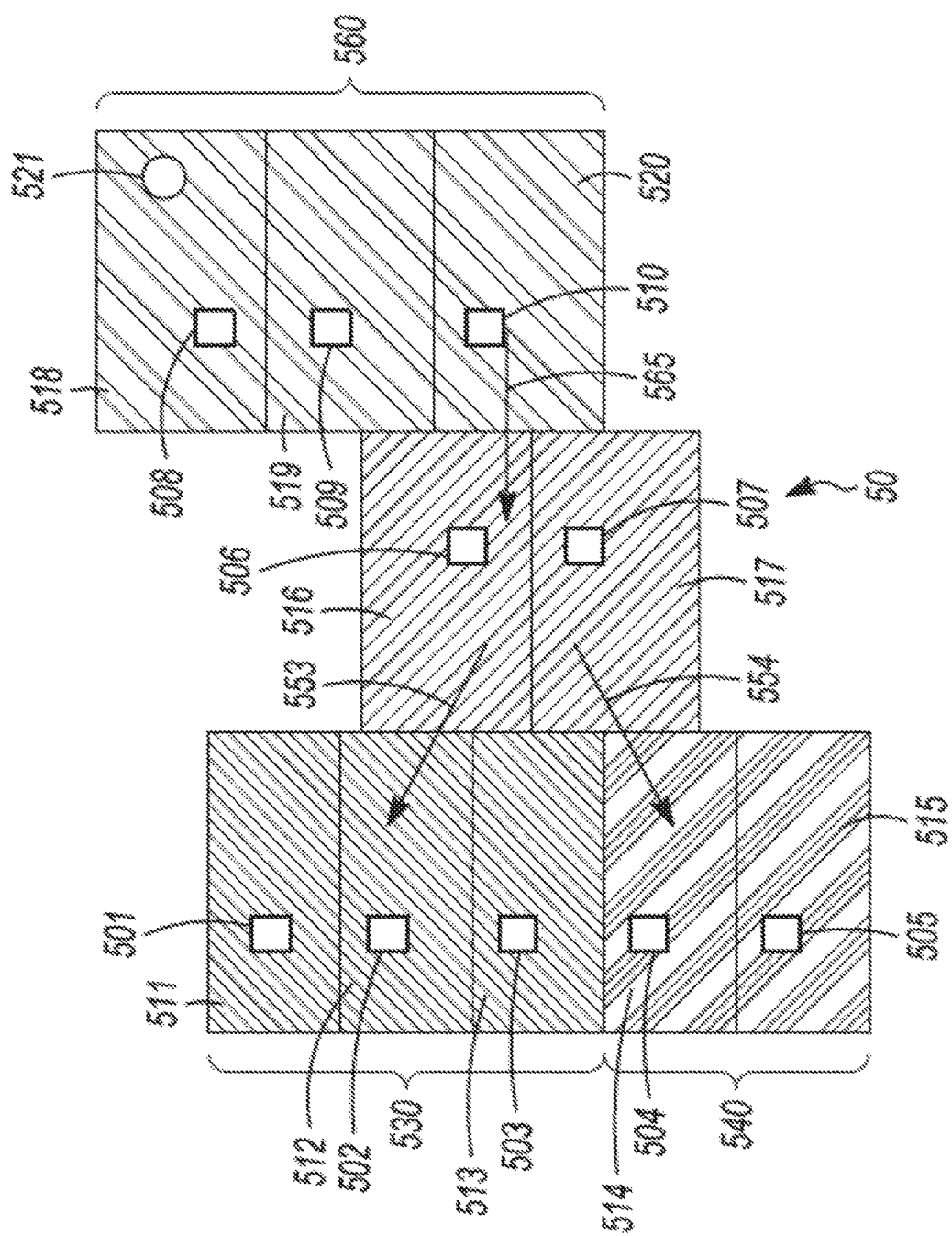
FIG. 5A illustrates aspects of clock tree clustering in accordance with some embodiments described herein.
Figure 5B:
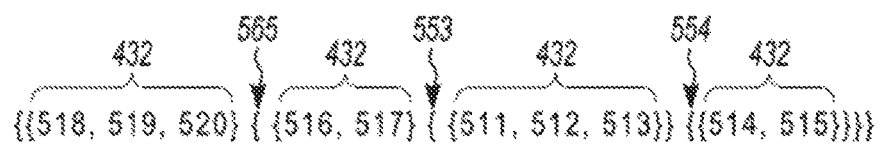
FIG. 5B illustrates aspects of clock tree clustering in accordance with some embodiments described herein.
Figure 5C:
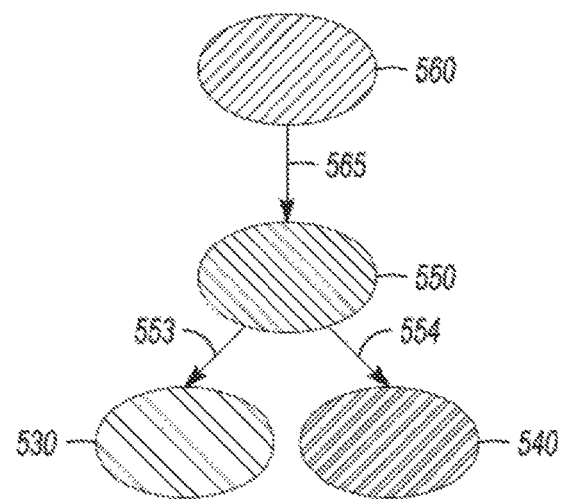
FIG. 5C illustrates aspects of clock tree clustering in accordance with some embodiments described herein.

In the example of FIGS. 5A-C, each partition has a single sink. In various other embodiments, a partition may include multiple buffers, repeaters, or other such clock circuit elements. FIG. 4A illustrates a clock tree hierarchy input 421 instantiated in a particular syntax, and including a nested list of sink groups 432, 434, 436, 442, 444, and 446. Sink groups 432, 434, and 436 are first-tier sink groups, and sink groups 442, 444, and 446 are second-tier sink groups. In other embodiments, any number of nesting tiers may be present within a clock tree hierarchy input, with the different sink groups and nesting structures indicating the clustering and associated routing topology for a clock tree.

In the particular format of the clock tree hierarchy input 421, a set of outer brackets (e.g., { }) contain all of the different sink groups. Each tier of partition groups is then represented by subsequent sets of nested brackets, such that the first tier of partition groups is within two sets of brackets, and the second tier of sink groups is within three sets of brackets. Embodiments with additional tiers of sink groups would include additional sets of nested brackets.

FIG. 4B shows a clock tree in a timing format, with the time delay from the source increasing from a node 422 down towards sinks 400-408. FIG. 4C shows a clock tree routing for a source 410 and sinks 400-408 in an example physical layout. In the tree diagram of FIG. 4B and the routing layout of FIG. 4C, the sinks 400-408 correspond to sink0 through sink8, respectively. The three first-tier sink groups 432, 434, and 436 of the clock tree hierarchy input 421 are represented by the three routes splitting off at the node 422. The node 422 is represented by a route in FIG. 4C that includes the source 410 and routes leading off to the various subsections of the clock tree. A route 482 then leads from the node 422 (e.g., an initial node or base branch, or a route, branch, or node connected directly to the source 410) to a first branch 452 associated with the first-tier sink group 432 (which includes the sinks 400, 401, and 402). The first branch 452 is connected directly to the sink 400 via a route 484. The first branch 452 is also connected to a second branch 462 via a route 486. The second branch 462 is associated with the second-tier sink group 442, and is directly connected to the sinks 401 and 402 via respectively corresponding routes 487 and 488.

Thus, as can be seen from FIGS. 4A-C, the syntax of the clock tree hierarchy input 421 provides clustering guidelines used to generate routings of a clock tree in FIG. 4C, without providing exact details of the route positions. Instead, the various sink groups and nestings of sink groups provide an outline or guide, which is used by a CTS tool in generating the final clock tree layout while complying with the represented clustering intent of the clock tree hierarchy input 421.

FIGS. 5A-C illustrate additional aspects of clock tree clustering in accordance with some embodiments described herein. Whereas the example embodiment represented in FIGS. 4A-C shows a simple clock tree clustering representation with each sink at the bottom of a path from the source through various branches, the embodiment of FIGS. 5A-C illustrates intended transitions between different partition groups. In some embodiments, partition groups are structured as an additional constraint on the clustering of sinks, as illustrated here with a single sink in each partition. In other embodiments, partitions with any number of sinks may be used. As described above, the use of partitions allows certain circuit designs to be simplified by allowing different partitions to be implemented separately in parallel. Additionally, in some embodiments, some partitions may be structures as clones of a master partition. Such structures allow multiple instances of a particular partition to be included in a circuit design, with adjustments to the master structure propagated to the structure of each clone as the circuit design is updated and adjusted.

Various embodiments and operations are described herein, for both groupings of partitions and groupings of sinks. These embodiments are illustrative, and it will be apparent that various operations described for sink groupings and partition groupings will apply to each other, such that clustering and topology generation described herein may be applied to both partition grouping and sink grouping, even if the specific operations are described herein only within the context of one or the other. FIG. 5A shows a source 521 and sinks 501-510. Each sink 501-510 is within a partition 511-520. The partitions are grouped, with partitions 511-513 in a partition group 530, partitions 514-515 in a partition group 540, partitions 516 and 517 in a partition group 550, and partitions 518-520 in a partition group 560. Additionally, a transition 565 between the partition groups 560 and 550, a transition 553 between the partition groups 550 and 530, and a transition 554 between the partition groups 550 and 540 are indicated.

FIG. 5B illustrates a clock tree hierarchy input with a particular syntax to represent the partitions, groupings, and transitions shown in FIG. 5A. Just as above in the syntax of FIG. 4A, FIG. 5B includes an outer set of brackets. In FIG. 5B, the partition groups 560, 550, 540, and 530 are indicated as discussed above and illustrated in FIG. 5A, containing the corresponding sinks and partitions shown. FIGS. 5A-C include the transitions as indicated in FIG. 5B and shown in FIGS. 5C and 5A. As shown in FIG. 5B, certain brackets indicate the transitions 565, 553, and 554 between the different partition groups 560, 550, 530, and 540. Each transition represents a port that will be inserted between partition groups. These transition ports are essentially between a pair of partitions, where one partition is in a first (e.g., parent) group, and the other partition is in the second (e.g., child) partition group. FIG. 5C illustrates the transitions 565, 553, and 554 between the different partition groups 560, 550, 530, and 540 as detailed above. The particular partitions that are connected by a given transition are selected by the CTS tool, unless the layout and partition groups of a particular circuit design do not result in freedom to select transitions. While the clock tree hierarchy input provides routing instructions and certain ports represented by the transition indicators, additional ports between other partitions may optionally also be added by the CTS tool as needed, if they are not in violation of partition transition constraints such as single port constraints between partition groups. The ports indicated by the transition indicators, however, are not optional as they are indicated directly by the designer with the clock tree hierarchy input.

The above syntax and the corresponding routing directions for clustering different clock tree elements thus provide an outline for aspects of clock tree routing. A processor that accepts a clock tree hierarchy input using the above described syntax or a similar interpretable syntax enables routing directions to be provided simply by a designer for certain clustering of elements in a clock tree. While partitions with sinks and sources are particularly described, the syntax of a particular system allows repeaters, buffers, inverters, and other such clock tree elements to be described as part of a particular partition or partition group. Depending on the specificity with which the clock tree elements and partitions are described, a CTS tool may place the elements and the routing between the elements with varying levels of decision making by the CTS tool. Thus, an input to a CTS tool as described above allows a designer to direct clustering within a clock tree in various different ways.

Further, in addition to directing clustering, certain parameters may also be set within a syntax in accordance with various embodiments described herein. FIGS. 6, 7A-B, and 8 illustrate aspects of partition group parameters for use with clock tree clustering in accordance with some embodiments described herein. In various embodiments, the parameters are applied to individual partitions, groups of partitions, nested portions of a group of partitions, transitions, or any other portion of a circuit design or routing direction signaled by a clock tree hierarchy input in accordance with embodiments described herein.

Figure 6:
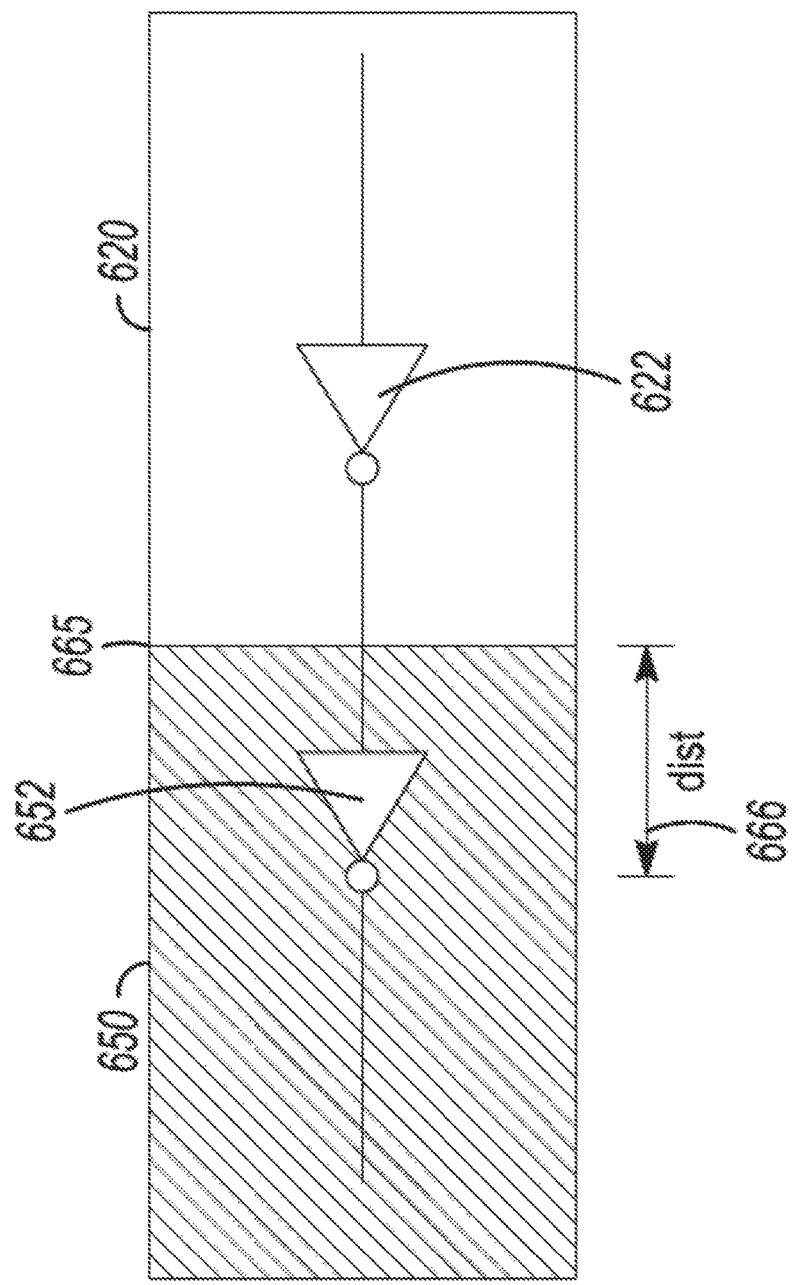
FIG. 6 illustrates aspects of partition group parameters for use with clock tree clustering in accordance with some embodiments described herein.

FIG. 6 illustrates partition groups 620 and 650 with a transition 665. The partition group 620 includes a clock tree element 622, and the partition group 650 includes a clock tree element 652. In some embodiments, a parameter provided as part of a clock tree hierarchy input defines a maximum distance that a clock tree element may be placed from a transition between two partition groups. In the illustrated example of FIG. 6, a parameter 666 defines a maximum distance for the clock tree element 652 from the transition 665 at the boundary shared with the partition group 620.

Figure 7A:
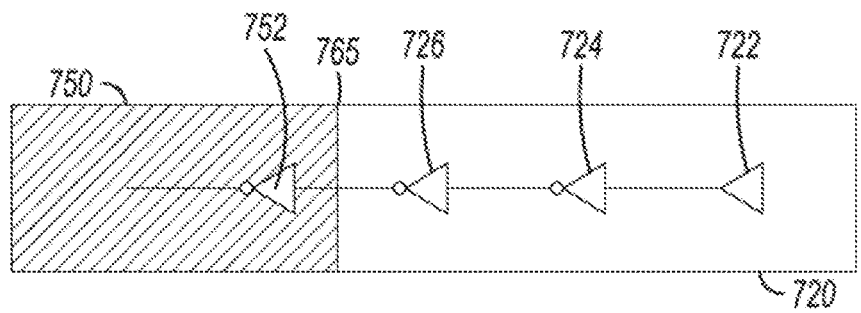
FIG. 7A illustrates aspects of partition group parameters for use with clock tree clustering in accordance with some embodiments described herein.
Figure 7B:
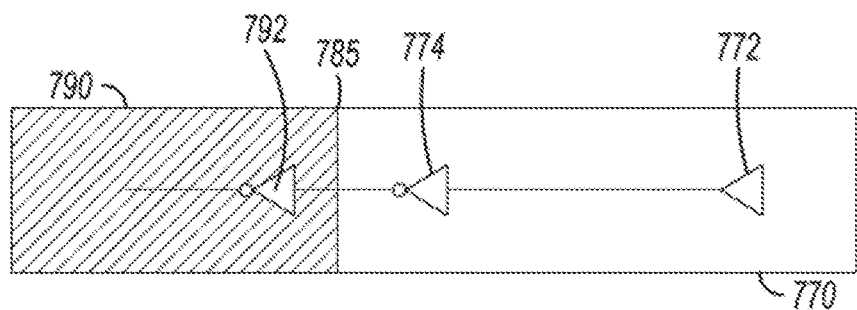
FIG. 7B illustrates aspects of partition group parameters for use with clock tree clustering in accordance with some embodiments described herein.

FIGS. 7A and 7B illustrate an additional parameter that may be defined within a clock tree hierarchy input. FIG. 7A shows partition groups 720 and 750 with a transition 765. The partition group 720 includes multiple clock tree elements including a source 722 and inverters 726 and 724. The partition group 750 includes a clock tree element 752. FIG. 7B shows partition groups 770 and 790 with a transition 785. The partition group 770 includes a root 772 and an inverter 774, and the partition group 790 includes a clock tree element 792. In some embodiments, a parameter associated with a partition group indicates whether the clock signal at a transition associated with the partition group is to be inverted or non-inverted compared to the clock signal from a source or root associated with the partition group. In some embodiments, a root may be any element within a partition group, with the relevant signal defined as inverting or non-inverting compared to that element.

Figure 8:
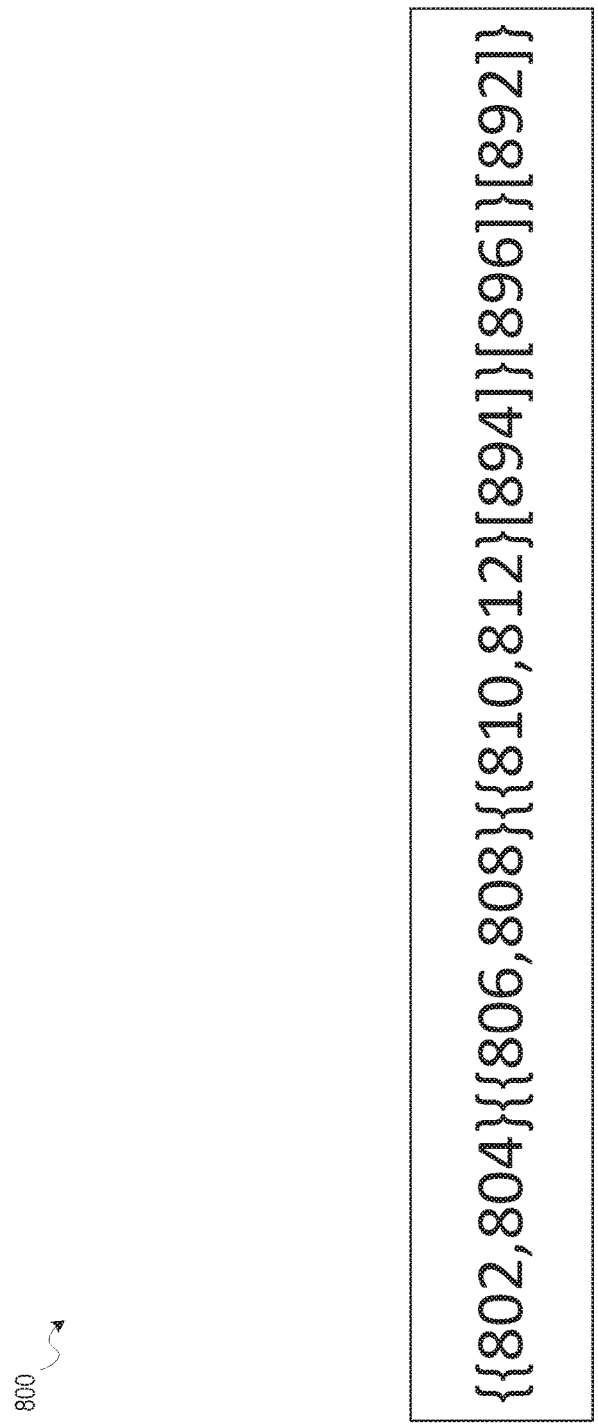
FIG. 8 illustrates aspects of partition group parameters for use with clock tree clustering in accordance with some embodiments described herein.

FIG. 8 illustrates an example clock tree hierarchy input 800 in accordance with another example embodiment. Just as above in the examples of FIGS. 4A and 5B, the clock tree hierarchy input 800 includes an outer set of brackets, and additional brackets representing partition groups in different tiers. The clock tree hierarchy input 800 includes a first group cluster (e.g. a syntax element of a clock tree hierarchy input) with elements 802 and 804, where the first group cluster is associated with a parameter 892. A transition is then indicated between the first group cluster and a second group cluster identified as including elements 806, 808, 810, and 812. Additionally, the second group cluster is associated with a parameter 896. Further, a second-tier nested group cluster is identified within the second group cluster, with the second-tier nested group cluster including the elements 810 and 812, and associated with a parameter 894.

In additional embodiments, such syntax may be used to associate any number of parameters with a partition or partition group. For example, the first group cluster including the elements 802 and 804 may be associated with any number of parameters. One parameter may indicate an inverted or non-inverted state requirement for the transition with the subsequent partition group. Another parameter may indicate a maximum distance from a partition boundary to a first element within a partition. In other embodiments, any other such parameters may be used, including parameters limiting the number of elements for a particular partition or partition group; parameters indicating spacing between elements within a partition or partition group; parameters indicating exact distances between partition boundaries, transitions, and elements; or any other such parameters that may be defined.

In accordance with the syntax of FIG. 8, a simple clock tree hierarchy input representing the system of FIG. 6 could be {{622}{{652}}[distance]), with the distance parameter indicating a maximum distance from a transition 665 port to a nearest clock tree element. If a CTS tool determines that an additional element is to be placed between the clock tree element 652 and a port associated with the transition 665, the CTS tool would place the new element at least the threshold distance from the transition 665 port, and move the clock tree element 652 further along the routing within the partition group 650.

Similarly, in accordance with the syntax of FIG. 8, a clock tree hierarchy input to generate a resulting clock tree represented by FIG. 7A could be {{722}[non-inverting] {{752}}}, with the input including clustering guidelines for a first partition group including the source 722 with a transition port indicated with a second partition group including the clock tree element 752, and the port having a non-inverted signal relative to the signal at the source 722. A CTS tool accepting this input may determine that the inverter 724 is needed to meet various circuit criteria in generating a clock tree, and to comply with the input indicating that the transition 765 should have a non-inverted signal, a second inverter may be added by the CTS tool. In other embodiments, the input may specify all three elements 722, 726, and 724, and a CTS tool could further modify the clock tree to add additional elements as needed to meet the clustering guidelines presented by the clock tree hierarchy input while further creating routes and adding elements within a clock tree to meet other circuit design criteria.

Similarly, a clock tree hierarchy input for FIG. 7B could be {{772}[inverting]{{792}}}, with the inverter 774 added by a CTS tool to meet the inverting criteria of the input. Alternatively, each element may be defined by the input as {{772, 774}{{792}}} with no inverting parameter. With such an input, the CTS tool would be free to adjust the elements of the partition group 770 without regard to whether a signal at a port associated with the transition 785 is inverting or not relative to the signal of the root 772. In order to force any automated changes from a CTS tool to keep the inverting status of the signal at the transition 785, the input may also be {{772, 774}[inverting]{{792}}}.

While the above embodiments illustrate particular syntax implementations, it will be apparent that other syntax implementations are possible within the scope of the present description. For example, parameter values may be placed to either side of an associated grouping or nesting for a partition or partition group. In other embodiments, separate inputs may be provided with information representing clustering and routing guidelines that are represented by a single input in accordance with the above embodiments.

Figure 9:
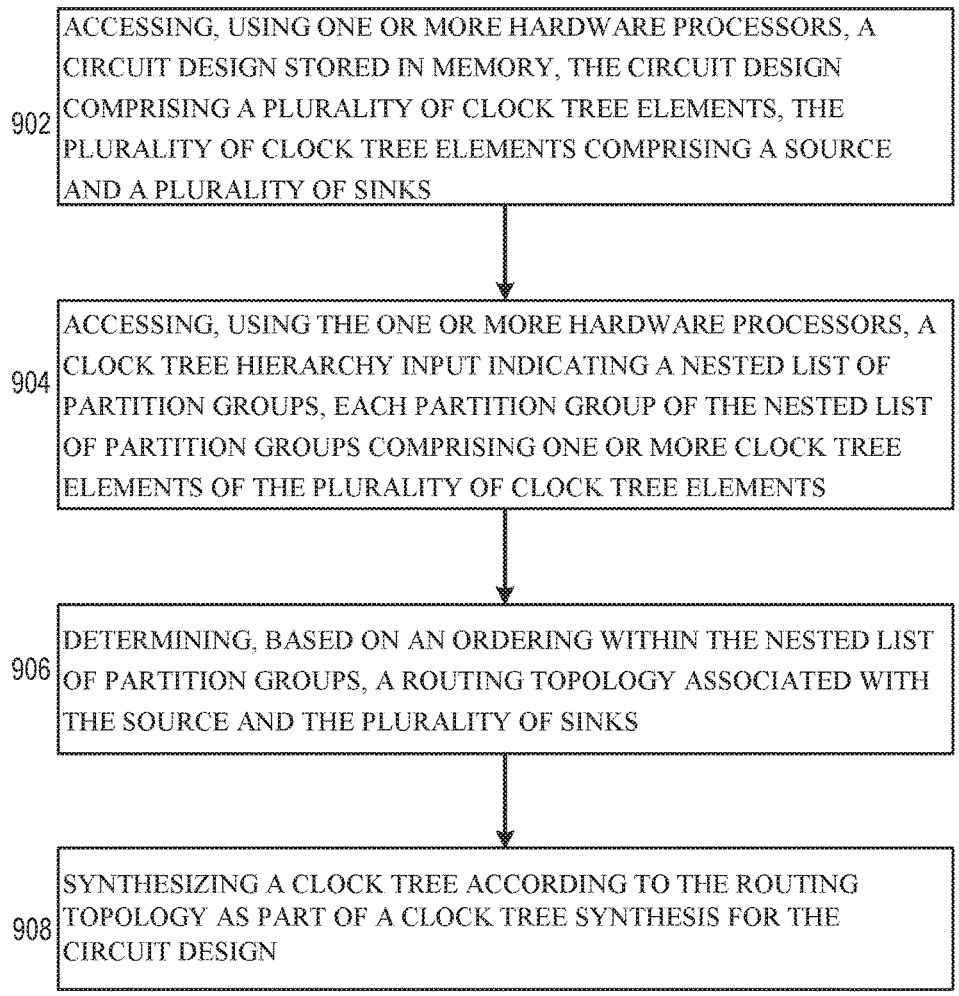
FIG. 9 describes a method for clock tree clustering in accordance with some embodiments.

FIG. 9 describes a method 900 for clock tree clustering in accordance with some embodiments. The method 900 particularly describes one method for generating or updating a circuit design using clock tree hierarchy (e.g. clustering) inputs. In some embodiments, the method 900 is performed by a computing device with one or more processors. In some embodiments, the method 900 is embodied in computer-readable instructions stored in a non-transitory storage device, such that when the instructions are executed by one or more processors of a device, the device performs the method 900. Other embodiments may be implemented using any acceptable format or instantiation.

The method 900 includes operation 902 involving accessing, using one or more hardware processors, a circuit design stored in memory, the circuit design comprising a plurality of clock tree elements, the plurality of clock tree elements comprising a source and a plurality of sinks. In some embodiments, the plurality of clock tree elements additionally comprises repeaters, inverters, buffers, or any other such circuit elements.

A clock tree hierarchy input is then accessed in operation 904, with the clock tree hierarchy input indicating a nested list of partition groups or sink groups, each group of the nested list of groups comprising one or more clock tree elements of the plurality of clock tree elements. In some embodiments, the clock tree hierarchy input is processed as a command input from a circuit designer. In other embodiments, the clock tree hierarchy input is accessed from a memory.

The clock tree hierarchy input is then processed by the one or more hardware processors to determine, based on an ordering within the nested list of partition groups or sink groups, a routing topology associated with the source and the plurality of sinks in operation 906. The routing topology may include defining aspects of various clusters of partitions and partition groups or sink groups. These directions may involve specific connections between individual circuit elements, or general indications of connections between partition groups or sink groups with specific routings between circuit elements to be determined by a CTS process.

Then, after the routing topology is determined from the clock tree hierarchy input, a clock tree is synthesized according to the routing topology as part of a clock tree synthesis for the circuit design in operation 908. In various embodiments, this CTS generation of a clock tree may be performed at different points in an overall circuit design process, such as the design flow 100 of FIG. 1. Similarly, within an overall circuit design process, the CTS may be repeated multiple times with different clock tree hierarchy inputs, with a resulting clock tree selected by a designer or selected based on comparisons of sets of system performance criteria for different clock trees. The above embodiments thus allow the specification of clustering intent without modifying the circuit design. Instead, an input to a CTS flow allows clock tree structure guidance that complies with a clustering intent provided by a designer that is implemented directly by a CTS tool. In some embodiments, the use of such clock tree hierarchy inputs to guide CTS preempts any need to modify the overall design manually in a way that may be undesirable in a process flow. Similarly, adverse effects of direct manual design modifications are limited, and due to the simplicity of specifying clustering constraints, multiple iterations can be explored with different clustering providing different sets of routing directions, with the option to compare and select between the different resulting clock trees.

In some embodiments, the clock tree hierarchy input specified by a user may not be feasible considering the possible partition transition, or other constraints of the circuit design such as routing, placement, preserved hierarchy ports, preserved module boundaries, or other such aspects of a circuit design. In some systems, conflicts between these constraints may be identified and, if they are not resolvable by adjustments that may be performed automatically by the tool, the conflict is identified and reported to a user (e.g. via a communication or display output). In such embodiments, the operations will terminate and wait for updates from a user to resolve the conflict.

In some embodiments, each nesting within the nested list of partition groups is associated with a clock tree branch of the routing topology. In other embodiments, a syntax for a particular system allows branches or clusters of elements to be represented in different ways. In one particular embodiment, the nested list of sink groups comprises a first-tier nesting comprising a first sink, a second sink, and a third sink, and a second-tier nesting comprising the second sink and the third sink. In further such embodiments, the routing topology comprises a first route from the source to a first clock tree branch associated with the first-tier nesting, a second route from the first clock tree branch to the first sink, and a third route from the first clock tree branch to a second clock tree branch associated with the second sink and the third sink. Such an embodiment may then include any number of different nesting tiers, branches, and elements within a clock tree.

In some embodiments, each partition of the nested list of partition groups is associated with a single sink of the plurality of sinks and each partition group of the nested list of partition groups comprises one or more partitions. In such an embodiment, the nested list of partition groups may comprise a set of grouping indicators and a set of transition indicators. In some such embodiments, each transition indicator of the set of transition indicators is associated with a port to be inserted between a pair of partitions, with a first partition of the pair of partitions from a different partition group than a second partition of the pair of partitions. In other such embodiments, synthesizing the clock tree according to the routing topology as part of the clock tree synthesis for the circuit design comprises identifying a layout location for each port to be inserted between pairs of partition groups. In further such embodiments, synthesizing the clock tree according to the routing topology as part of the clock tree synthesis for the circuit design comprises automatically identifying ports to be placed between partitions within partition groups independently of the routing topology from the clock tree hierarchy input.

In addition to the various clusters of elements indicated by the clock tree hierarchy input, some or all clusters may have partition parameters, partition group parameters, and clock tree element parameters indicated by the clock tree hierarchy input. In some embodiments with such parameters, the parameters may indicate a status at a transition or port as inverting or non-inverting, as detailed above. In other embodiments, such parameters can indicate position limitations for elements within a partition or partition group.

The routing directions generated by an embodiment are used by a CTS flow as guidelines within which numerous other operations may occur. Additional routing processes or optimizations may operate within the limits identified by routing directions from a clock tree hierarchy input. Additional circuit elements may be added to a clock tree within guidelines indicated by the clock tree hierarchy input. For example, a clock tree may include a certain number of elements, with the clock tree hierarchy input only indicating guidelines for a portion of the elements in the clock tree. The remaining elements may be added to meet circuit design criteria. A circuit design, for example, may have 100 sinks, with clustering rules generated for 50 of the sinks based on the clock tree hierarchy input, with the remaining 50 sinks connected to the clock tree independently of any routing directions from the clock tree hierarchy input.

While particular embodiments are described above, including ordered steps and placement of elements in various orders, it will be apparent that other embodiments may include repeated operations, or any number of intervening operations between the operations described.

Figure 10:
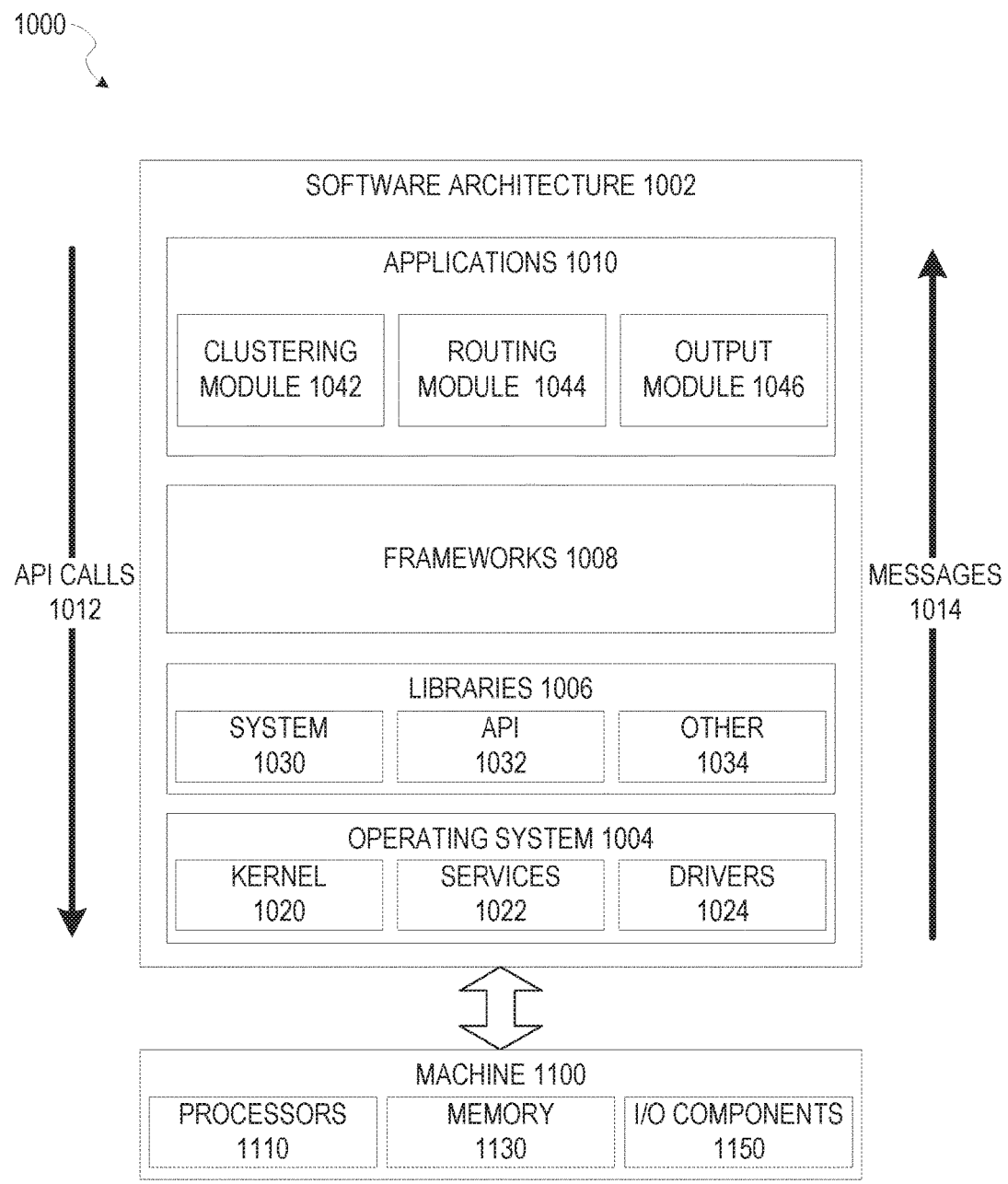
FIG. 10 is a block diagram illustrating an example of a software architecture that may be operating on an electronic design automation (EDA) computer and used with methods for clock tree clustering according to some example embodiments.

FIG. 10 is a block diagram 1000 illustrating an example of a software architecture 1002 that may be operating on an EDA computer and used with methods for clock tree clustering according to some example embodiments. The software architecture 1002 can be used as an EDA computing device to implement any of the methods described above. Aspects of the software architecture 1002 may, in various embodiments, be used to store circuit designs and execute timing analysis or optimization in an EDA environment to generate circuit designs, with physical devices generated using these circuit designs.

FIG. 10 is merely a non-limiting example of a software architecture 1002, and it will be appreciated that many other architectures can be implemented to facilitate the functionality described herein. In various embodiments, the software architecture 1002 is implemented by hardware such as a machine 1100 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, software frameworks 1008, and applications 1010. Operationally, the applications 1010 invoke application programming interface (API) calls 1012 through the software stack and receive messages 1014 in response to the API calls 1012, consistent with some embodiments. In various embodiments, any client device, server computer of a server system, or other device described herein may operate using elements of the software architecture 1002. An EDA computing device described herein may additionally be implemented using aspects of the software architecture 1002, with the software architecture 1002 adapted for operating to perform clock synthesis and modification of clock trees using clock tree hierarchy inputs for clustering.

In one embodiment, an EDA application of the applications 1010 performs routing tree generation and/or adjustments, according to embodiments described herein, using various modules within the software architecture 1002. For example, in one embodiment, an EDA computing device similar to the machine 1100 includes the memory 1130 and one or more processors 1110. The processors 1110 implement a clustering module 1042 to process a clock tree hierarchy input indicating a nested list of partition groups. The clustering module 1042 then determines a set of routing limitations or directions which are used by a routing module 1044 when generating a routing path (e.g. a clock tree, power transmission lines, a data path, etc.) The routing is finalized by an output module 1046 if the criteria/design thresholds are met, and updated by the routing module 1044 if the criteria/design thresholds are not met. In various other embodiments, other processor-implemented modules may be used for CTS with clustering limitations provided by a designer and implemented using clustering processes within an EDA tool.

In some embodiments, the output module 1046 may then be used to update a display of the I/O components 1150 of the EDA computing device with data associated with the updated routing tree generated by the process.

In various other embodiments, rather than being implemented as modules of one or more applications 1010, some or all of the modules 1042, 1044, and 1046 may be implemented using elements of the libraries 1006 or the operating system 1004.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 such as libraries of multi-instance blocks for use in an EDA environment or other libraries that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 may also include other libraries 1034.

The software frameworks 1008 provide a high-level common infrastructure that can be utilized by the applications 1010, according to some embodiments. For example, the software frameworks 1008 provide various graphic user interface (GUI) functions, high-level resource management, high-level location services, and so forth. The software frameworks 1008 can provide a broad spectrum of other APIs that can be utilized by the applications 1010, some of which may be specific to a particular operating system 1004 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files, and viewdefinition files are examples that may operate within a software architecture 1002, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1100 including processors 1110), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1100, but deployed across a number of machines 1100. In some example embodiments, the processors 1110 or processor-implemented modules are located in a single geographic location (e.g., within a home environment, an office environment, or a server farm). In other example embodiments, the processors 1110 or processor-implemented modules are distributed across a number of geographic locations.

Figure 11:
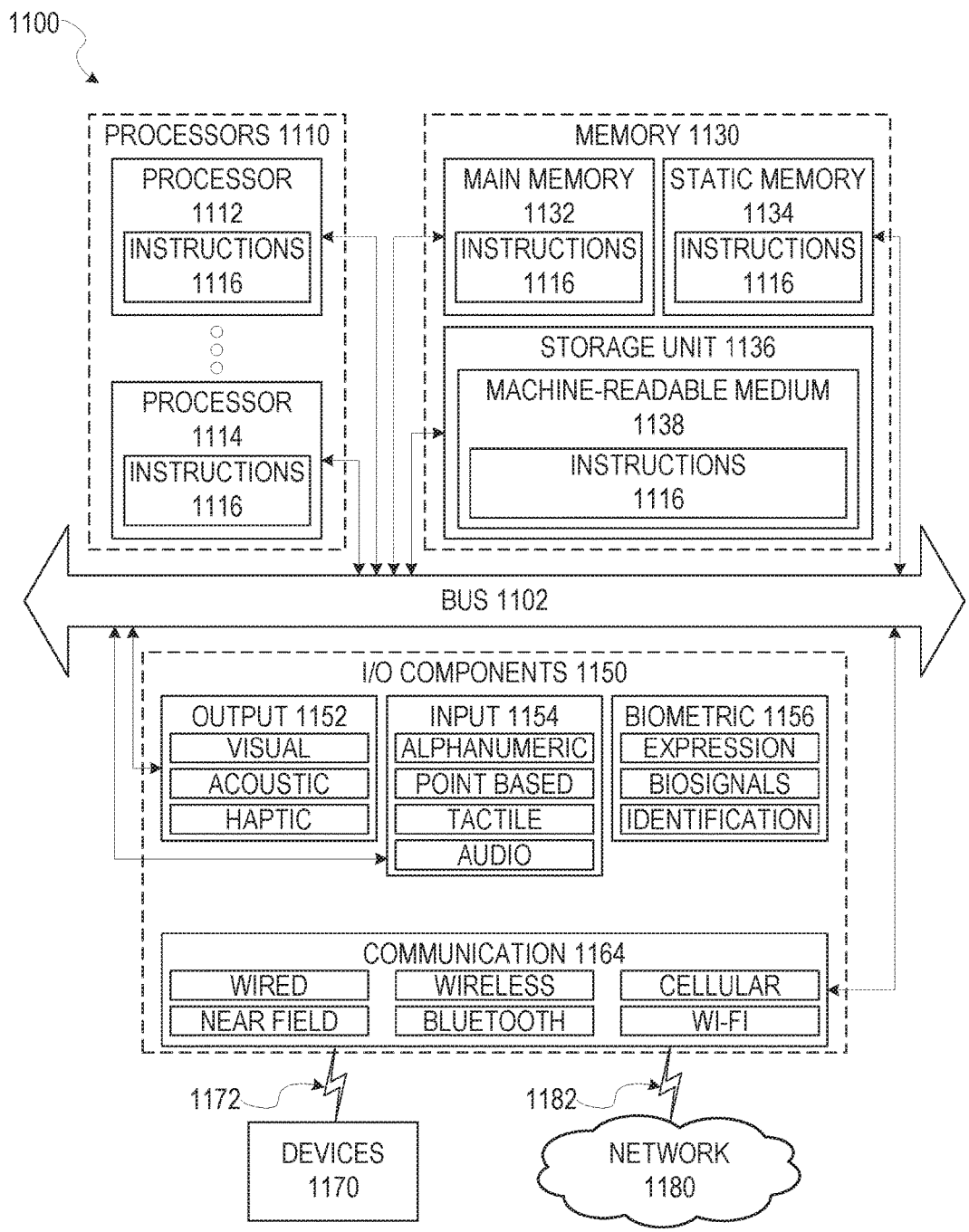
FIG. 11 is a diagrammatic representation of a machine in the form of a computer system within which a set of instructions are executed, causing the machine to perform any one or more of the methodologies discussed herein, according to some example embodiments.

FIG. 11 is a diagrammatic representation of the machine 1100 in the form of a computer system within which a set of instructions may be executed for causing the machine 1100 to perform any one or more of the methodologies discussed herein, according to an example embodiment. FIG. 11 shows components of the machine 1100, which is, according to some embodiments, able to read instructions from a machine-readable medium (e.g., a machine-readable storage medium) and perform any one or more of the methodologies discussed herein. In some embodiments, the machine 1100 may operate with instructions 1116 (e.g., software, a program, an application, an applet, an app, or other executable code) for causing the machine 1100 to perform any one or more of the methodologies discussed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute the instructions 1116 contemporaneously. Although FIG. 11 shows multiple processors 1110, the machine 1100 may include a single processor 1112 with a single core, a single processor 1112 with multiple cores (e.g., a multi-core processor 1112), multiple processors 1110 with a single core, multiple processors 1110 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., the instructions 1116) for execution by a machine (e.g., the machine 1100), such that the instructions, when executed by one or more processors of the machine (e.g., the processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements", "design elements", and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, the communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a USB).

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long-Term Evolution (LTE) standard, others defined by various standard-setting organizations, other long-range protocols, or other data transfer technology.

Furthermore, the machine-readable medium 1138 is non-transitory (in other words, not having any transitory signals) in that it does not embody a propagating signal. However, labeling the machine-readable medium 1138 "non-transitory" should not be construed to mean that the machine-readable medium 1138 is incapable of movement; the machine-readable medium 1138 should be considered as being transportable from one physical location to another. Additionally, since the machine-readable medium 1138 is tangible, the machine-readable medium 1138 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for routing tree construction, the method comprising:
    accessing, using one or more hardware processors, a circuit design stored in memory, the circuit design comprising a plurality of clock tree elements, the plurality of clock tree elements comprising a source and a plurality of sinks;
    accessing, using the one or more hardware processors, a clock tree hierarchy input indicating a nested list of partition groups, each partition group of the nested list of partition groups comprising one or more clock tree elements of the plurality of clock tree elements;
    determining, based on an ordering within the nested list of partition groups, a routing topology associated with the source and the plurality of sinks; and
    synthesizing a clock tree according to the routing topology as part of a clock tree synthesis for the circuit design.

2. The method of claim 1 wherein each nesting within the nested list of partition groups is associated with a clock tree branch of the routing topology.

3. The method of claim 2 wherein the nested list of partition groups comprises a first-tier nesting comprising a first sink, a second sink, and a third sink, and a second-tier nesting comprising the second sink and the third sink.

4. The method of claim 3 wherein the routing topology comprises a first route from the source to a first clock tree branch associated with the first-tier nesting, a second route from the first clock tree branch to the first sink, and a third route from the first clock tree branch to a second clock tree branch associated with the second sink and the third sink.

5. The method of claim 1 wherein each partition of the nested list of partition groups is associated with a single sink of the plurality of sinks; and
wherein each partition group of the nested list of partition groups comprises one or more partitions.

6. The method of claim 5 wherein the nested list of partition groups comprises a set of grouping indicators and a set of transition indicators.

7. The method of claim 6 wherein each transition indicator of the set of transition indicators is associated with a port to be inserted between a pair of partitions, with a first partition of the pair of partitions from a different partition group than a second partition of the pair of partitions.

8. The method of claim 7 wherein synthesizing the clock tree according to the routing topology as part of the clock tree synthesis for the circuit design comprises identifying a layout location for each port to be inserted between pairs of partitions.

9. The method of claim 8 wherein synthesizing the clock tree according to the routing topology as part of the clock tree synthesis for the circuit design comprises automatically identifying ports to be placed between partitions within partition groups independently of the routing topology from the clock tree hierarchy input.

10. The method of claim 7 wherein the clock tree hierarchy input further comprises one or more partition group parameters.

11. The method of claim 10 wherein each partition group parameter is associated with a single partition group to create an associated partition group, and placed next to a grouping indicator for the associated partition group.

12. The method of claim 10 wherein the nested list of partition groups comprises a first partition group and a second partition group; and
wherein a first transition indicator identifies a first port between the first partition group and the second partition group.

13. The method of claim 12 wherein the first partition group of the nested list of partition groups is associated with a boundary distance parameter of the one or more partition group parameters; and
wherein the boundary distance parameter for the first partition group is associated with a boundary distance parameter value indicating a maximum distance from the first port to a first clock tree element within the first partition group.

14. The method of claim 12 wherein the plurality of clock tree elements further comprises a plurality of inverters and a plurality of buffers.

15. The method of claim 12 wherein the first partition group of the nested list of partition groups is associated with a boundary status parameter of the one or more partition group parameters; and
wherein the boundary status parameter for the first partition group is associated with a boundary status parameter value indicating an inverted or non-inverted clock signal state at the first port relative to a clock signal at the source.

16. The method of claim 1 further comprising:
generating an updated circuit design using the clock tree; and
generating a set of masks from the updated circuit design for use in generating an integrated circuit comprising the updated circuit design.

17. A device for generating a circuit design, comprising:
a memory configured to store a circuit design, the circuit design comprising a plurality of circuit elements, the plurality of circuit elements comprising a source and a plurality of sinks; and
one or more processors coupled to the memory and configured to:
access the circuit design from the memory;
process a hierarchy input indicating a nested list of sink groups, each sink group of the nested list of sink groups comprising one or more circuit elements of the plurality of circuit elements;
determining, based on an ordering within the nested list of sink groups, a routing topology associated with the source and the plurality of sinks; and
synthesizing a routing tree according to the routing topology as part of a routing tree synthesis for the circuit design.

18. The device of claim 17 wherein the routing tree is at least a portion of a data path within the circuit design.

19. A non-transitory computer-readable storage medium comprising instructions that, when executed by one or more processors of a computing device, cause the computing device to perform operations for electronic design automation comprising:
accessing a circuit design stored in memory, the circuit design comprising a plurality of clock tree elements, the plurality of clock tree elements comprising a source and a plurality of sinks;
accessing a clock tree hierarchy input indicating a nested list of partition groups, each partition group of the nested list of partition groups comprising one or more clock tree elements of the plurality of clock tree elements;
determining, based on an ordering within the nested list of partition groups, a routing topology associated with the source and the plurality of sinks; and
synthesizing a clock tree according to the routing topology as part of a clock tree synthesis for the circuit design.

20. The non-transitory computer-readable storage medium of claim 19 wherein at least a first partition and a second partition of the nested list of partition groups are clone partitions associated with a master partition, such that a structure of the first partition and the second partition is defined by a master structure of the master partition, and adjustments to the master structure of the master partition are repeated in the structure of the first partition and the second partition.

* * * * *